(12) United States Patent
Lim (10) Patent No.: US 8,209,341 B2
(45) Date of Patent: Jun. 26, 2012

(54) CONFIGURABLE TRANSFORMATION MACRO

(75) Inventor: Kai Peng Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/241,226

(22) Filed: Sep. 30, 2008

(65) Prior Publication Data
US 2010/0082706 A1 Apr. 1, 2010

(51) Int. Cl.
*G06F 17/00* (2006.01)
(52) U.S. Cl. .................................................. 707/756
(58) Field of Classification Search .................. 707/756
See application file for complete search history.

(56) References Cited

U.S. PATENT DOCUMENTS

| | | | |
|---|---|---|---|
| 5,247,683 A | 9/1993 | Holmes et al. | |
| 5,537,592 A * | 7/1996 | King et al. | 707/756 |
| 5,555,346 A | 9/1996 | Gross et al. | |
| 5,950,011 A | 9/1999 | Albrecht et al. | |
| 6,253,205 B1 | 6/2001 | Quarato et al. | |
| 6,473,765 B1 * | 10/2002 | Fink | 707/756 |
| 6,587,124 B1 | 7/2003 | Slaby | |
| 6,850,947 B1 * | 2/2005 | Chung et al. | 707/600 |
| 7,228,497 B2 | 6/2007 | Lander | |
| 7,725,702 B2 | 5/2010 | Arnfield et al. | |
| 7,752,156 B2 | 7/2010 | Stich et al. | |
| 7,836,063 B2 * | 11/2010 | Salazar et al. | 707/756 |
| 7,856,415 B2 | 12/2010 | Gatti | |
| 7,926,012 B1 | 4/2011 | Parimi et al. | |

(Continued)

FOREIGN PATENT DOCUMENTS
EP 0463251 A1 2/1992

OTHER PUBLICATIONS

Koehn et al., "Statistical Phrase-Based Translation", Proceedings of HLT-NAACL 2003, Main Papers, Edmonton Canada, May-Jun. 2003, pp. 48-54.

(Continued)

*Primary Examiner* — Sheree Brown
*Assistant Examiner* — Michael Le
(74) *Attorney, Agent, or Firm* — Yee & Associates, P.C.; Steven L. Bennett (57) ABSTRACT

Transforming source input data using a configurable transformation macro is provided. A transformation macro script is executed by a configurable transformation macro. One or more transformation templates are read by the transformation macro script. Input data is read by the transformation macro script from one or more source files. Logical processing of the transformation macro script and the one or more transformation templates is performed by the configurable transformation macro. It is determined whether constraints generated by the logical processing of the transformation macro script and the one or more transformation templates are valid. In response to determining that the constraints generated by the logical processing of the transformation macro script and the one or more transformation templates are valid, it is determined whether transformation of the input data is complete. In response to determining that the transformation of the input data is complete, a transformation output is outputted.

19 Claims, 7 Drawing Sheets

U.S. PATENT DOCUMENTS

| | | | |
|---|---|---|---|
| 7,970,779 B2* | 6/2011 | Smirnov et al. | 707/756 |
| 8,032,828 B2* | 10/2011 | Su et al. | 715/235 |
| 8,086,618 B2 | 12/2011 | Lim | |
| 2001/0056460 A1* | 12/2001 | Sahota et al. | 709/201 |
| 2002/0143823 A1 | 10/2002 | Stevens | |
| 2004/0083465 A1 | 4/2004 | Zhang et al. | |
| 2005/0097454 A1 | 5/2005 | Kinno et al. | |
| 2005/0154983 A1 | 7/2005 | Hailey et al. | |
| 2005/0251501 A1* | 11/2005 | Phillips et al. | 707/2 |
| 2006/0106856 A1 | 5/2006 | Bermender et al. | |
| 2006/0259470 A1 | 11/2006 | Chandrasekharan et al. | |
| 2007/0016764 A1 | 1/2007 | Arnfield et al. | |
| 2007/0073736 A1* | 3/2007 | Goetz | 707/100 |
| 2007/0186150 A1* | 8/2007 | Rao et al. | 715/506 |
| 2007/0198564 A1 | 8/2007 | Blackstone et al. | |
| 2007/0261025 A1 | 11/2007 | Seto et al. | |
| 2007/0299854 A1 | 12/2007 | Bohlmann et al. | |
| 2008/0022263 A1 | 1/2008 | Bak et al. | |
| 2010/0082523 A1 | 4/2010 | Lim | |
| 2010/0082954 A1 | 4/2010 | Lim | |
| 2011/0040824 A1 | 2/2011 | Harm | |

OTHER PUBLICATIONS

Sheard et al., "Template Meta-programming for Haskell", ACM SIGPLAn Notices, vol. 37, No. 12, Dec. 2002, pp. 60-75.

Mariatos et al., "A Mapping Algorithm for Computer Assisted Exploration in the Design of Embedded Systems", ACM Transactions on Design Automation of Electronic Systems, vol. 6, No. 1, Jan. 2001, pp. 122-147.

Roll, "Towards Model-Based and CCM-Based Applications for Real-Time Systems", Proceedings of the Sixth IEEE International Symposium on Object Oriented Real Time Distributed Computing, 2003, pp. 1-8.

USPTO Non-final office action dated Mar. 16, 2011 regarding U.S. Appl. No. 12/241,217.

USPTO Notice of allowance dated Aug. 26, 2011 regarding U.S. Appl. No. 12/241,217.

USPTO Office Action regarding U.S. Appl. No. 12/241,241, dated Oct. 3, 2011, 16 pages.

* cited by examiner

INPUT DATA SOURCE FILE
600

"compatability_filtering.dat"
Action, LHS, LHSProperty/Component,RHSProperty/Component, OCScope, Comment, MTsCompat
incompat, OS_DUMMY_OC#PM_P_ARB_OSType@Custom, 9200, Listed,limk A@20080121,
incompat, 1671,9070 | 9071 | 9072 | 9195, Listed, limk A@20080121, InAppMT=2345 |
compat, 4209$=0~43634210$=0 ,1771,9070 | 9071 | 9072 | 9195,Listed, limk A@20080121,

FIG. 6

TRANSFORMATION TEMPLATE FILE
700

"compatibility_filtering.tdt"
702 — <@@KEY=TP-COMPATABILITY_FILTERING>
704 — <@WRITE(FILE, $FILE_COMPAT$, false)>
706 — <@@HDR=$KBSName, RequiredParts#,LHSProperty/Component, Compatible, OCScope, Comment)>
       <@@VAR=$KBSNAME$,$LHS#$,$LHSPROPERTY/COMPONENT$,$RHSPROPERTY/COMPONENT$,$COMPAT_TYPE$,Listed,
       $COMMENT$>
708 — <@@HDR_FIRSTCOLUMN_START=Action,>
710 — <@@OUTFILE=FILE_COMPAT>

FIG. 7

TRANSFORMATION MACRO SCRIPT
800

```
"executeScript.tms"
    <@VAR(TPATH,VAR_FILENAME)>
802 —<@TPATH=@SETUP-INFO(TemplatePath)>                                              //Read TemplateDrive from setup file
804 —<@$INPATH$=C:\Kelvin\Dev\Projects\BH\workspace\bhMapper\workspace\generatedFiles)>    // Define input path
806 —<@$OUTPATH$=C:\Kelvin\Dev\Projects\BH\workspace\bhMapper\workspace\generatedFiles\.csv>  // Define ouput path
808 —<@F:READFILE(RULES_StartFile, $INPATH$/RULES_StartFILE.1st, STREAM)>            //Read a list file containting rules files.
810 —<@F:READTEMPLATE(TPATH, defaultvalues.tdt)>
812 —<@F: READTEMPLATH(TPATH, compatibility_filtering.tdt)>     }—820
814 —<@TRANSFORMTABLETEMPLATE(TP-DEFALUTVALUES,RULES_StartFile)>   // Transform template using TP-DEFAULTVALUES
816 —<@CLOSEALL()>                                                             // Close all files.
818 —<@PROCEED>                                                                // Proceed with the script.
```

FIG. 8

TRANSFORMATION OUTPUT
900

```
KBSName, RequiredParts,RequiredParts2, RequiredParts3,RequiredParts4,RequiredParts5,RequiredParts6,RequiredParts7,RequiredParts8,LHSP
             roperty/Component,RHSProperty/Component, Compatible,OCScope, Comment
902 — 1234_RSS_TMF_GROUP........OS_DUMMY_OC#PM_P_ARB_OSType@Custom, 9200, No, Listed, limk A@20080121
904 — 1234_RSS_TMF_GROUP.........1671,9070| 9072| 9071| 9195, No, Listed, limk A@20080121
906 — 1234_RSS_TMF_GROUP, 4209$=0, 43634210$=0.........1711, 9070| 9071| 9072| 9195,Yes, Listed, limk, A@20080121
```

CONFIGURABLE TRANSFORMATION MACRO

BACKGROUND OF THE INVENTION

1. Field of the Invention

The present invention relates generally to an improved data processing system and more specifically to a computer implemented method, system, and computer usable program code for transforming source input data from one data or object format to another data or object format using a configurable transformation macro.

2. Description of the Related Art

Today, transforming data files from one format to another is commonplace in the context of data stored in an Extensible Markup Language ("XML") format. This is in part because the XML data format has experienced widespread use. XML is quickly becoming the de facto standard for exchanging corporate data via structured documents, whether internally with business partners or via public applications across the Internet. With the proliferation of data stored in XML formats, the transformation of such data into formats that are recognized by diverse applications has also become widespread.

Currently, Extensible Stylesheet Language Transformations ("XSLT") is an industrial standard for translating XML documents to other formats. XSLT is a translating language that uses programming type syntaxes, which are quite complex. Also, XSLT does not recursively read data to initiate a data transform or to trigger an action. Moreover, XSLT only reads XML documents. Further, XSLT developers are required to do a lot of coding to allow the reading of multiple XML documents and to create complex logic required for complex XML document transformation. Furthermore, XSLT developers are required to redo the entire cycle again whenever a new process or business logic is involved.

BRIEF SUMMARY OF THE INVENTION

According to one embodiment of the present invention, source input data is transformed using a configurable transformation macro. A transformation macro script is executed by a configurable transformation macro. One or more transformation templates are read by the transformation macro script. Input data is read by the transformation macro script from one or more source files. Logical processing of the transformation macro script and the one or more transformation templates is performed by the configurable transformation macro. It is determined whether constraints generated by the logical processing of the transformation macro script and the one or more transformation templates are valid. In response to determining that the constraints generated by the logical processing of the transformation macro script and the one or more transformation templates are valid, it is determined whether transformation of the input data is complete. In response to determining that the transformation of the input data is complete, a transformation output is outputted.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
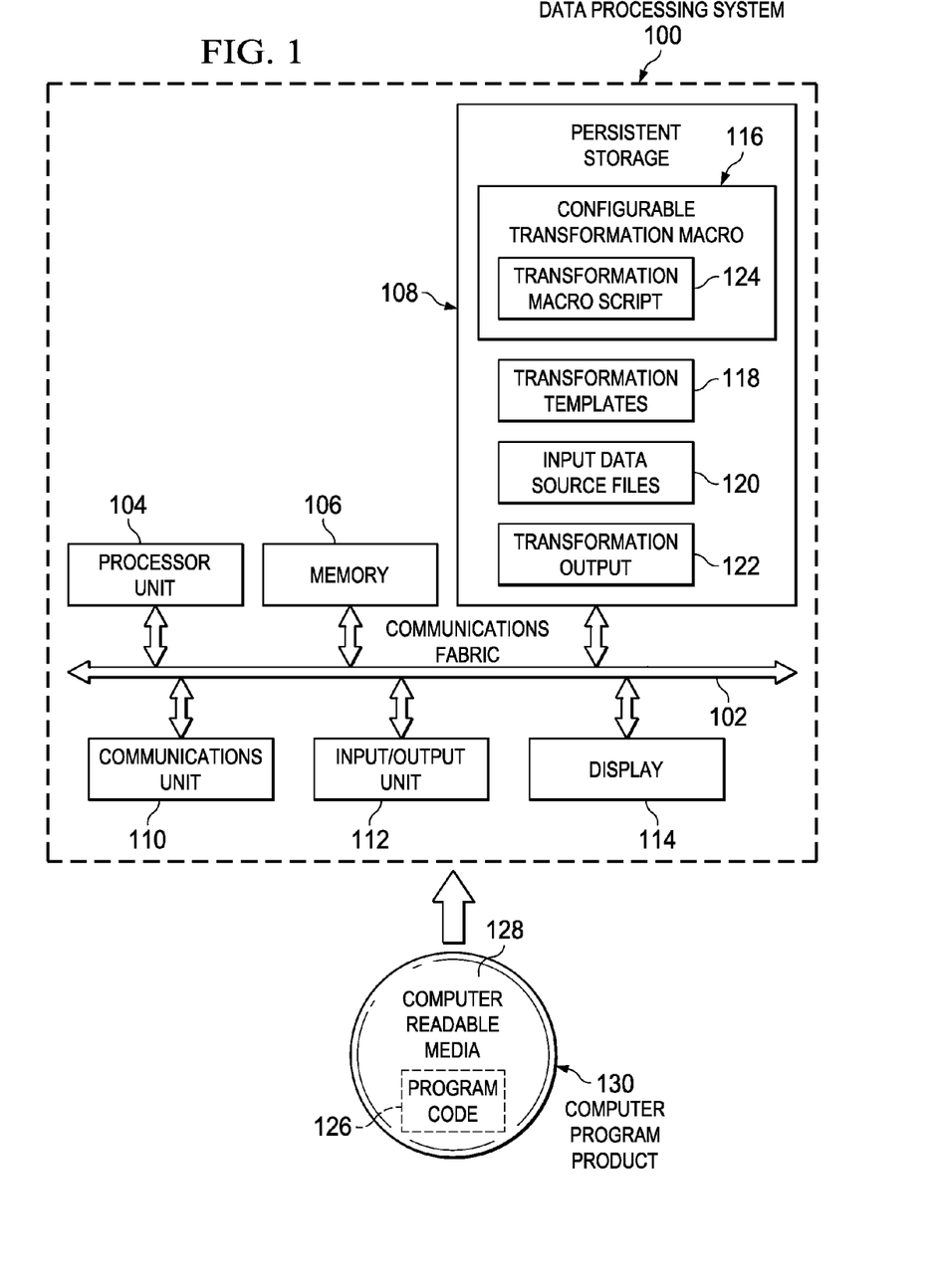
FIG. 1 is a diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a transient basis and/or a persistent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Configurable transformation macro 116, transformation templates 118, input data source files 120, and transformation output 122 reside on persistent storage 108. Configurable transformation macro 116 is a macro for transforming source input data, which is stored in a particular file format, into another file format. A macro is a rule or pattern that specifies how a particular data input sequence should be mapped to an output sequence according to a defined process or procedure. A file format is a specific way to encode data for storage in a computer file.

Configurable transformation macro 116 includes transformation macro script 124. Transformation macro script 124 is a scripting language, such as, for example, JavaScript®, for controlling the process of transforming source input data from one file format to another. Transformation macro script 124 utilizes transformation templates 118 in this file format transformation process. Transformation templates 118 represent one or more transformation templates that contain, for example, source input data, default values, and logic used in the file format transformation process.

Input data source files 120 represent one or more source data files, which transformation macro script 124 reads and processes into another file format. Even though this exemplary illustration shows input data source files 120 residing on persistent storage 108, input data source files 120 may alternatively reside on a remote database. Transformation output 122 represents the desired final output of the logical processing of input data source files 120 by configurable transformation macro 116 using transformation macro script 124 and transformation templates 118.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 126 is located in a functional form on computer readable media 128 that is selectively removable and may be loaded onto or transferred to data processing system 100 for execution by processor unit 104. Program code 126 and computer readable media 128 form computer program product 130 in these examples. In one example, computer readable media 128 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 128 also may take the form of a persistent storage, such as a hard drive, a thumb drive, or a flash memory that is connected to data processing system 100. The tangible form of computer readable media 128 is also referred to as computer recordable storage media. In some instances, computer readable media 128 may not be removable.

Alternatively, program code 126 may be transferred to data processing system 100 from computer readable media 128 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 126 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 126 may be a server computer, a client computer, or some other device capable of storing and transmitting program code 126.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 128 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Currently, multiple Java™ scripting language macros are used to generate constraints from developers' modeled rules into Selectica® KnowledgeBase Development Environment™ (.kbs) files during a configuration build process or during a development process by developers to test their newly modeled rules. These .kbs files are files that are used by a Selectica® configuration/rule engine to interact with a web application for configuration/transformation purposes. Illustrative embodiments reduce the complexity for creating transformation macros that use Java™ scripting language because illustrative embodiments do not require the complexity of programming techniques and syntaxes.

Illustrative embodiments, using a simple macro syntax, read source input data and transform this input data into a desired output. Illustrative embodiments may create whole configuration/transformation files, without the need of a database source. However, developers may easily add an extension to a database source when a database connection is needed.

In addition, illustrative embodiments reduce the need to create duplicate rules in a comma-separated values (CSV) file format for different machine types that have the same configuration constraints. A file encoded using a CSV format is used to store tabular data. Illustrative embodiments may generate multiple CSV files for each different machine type from a single data input source, without requiring developers to manually input rules into each CSV file associated with each machine type.

Illustrative embodiments use a simple configurable transformation macro to transform data from any source, such as, for example, from a list of files, to a respective .kbs file format for the source data, which is used by the rule engine. The configurable transformation macro, such as, for example, Java™ codes with or without XSLT, reads one or more transformation templates that provide transformation data and reads one or more modular transformation macro scripts that provide logical processing of source input data using the transformation data provided by the one or more transformation templates. Based on the transformation data provided by the transformation templates, the configurable transformation macro uses the transformation macro scripts to parse the input data, which may be provided by a single source or by multiple sources, and to create the desired output data or action accordingly.

The configurable transformation macro is a macro processing that analytically translates requests and mechanically navigates the source input data to create macro object responses. This macro processing provided by illustrative embodiments allows the configurable transformation macro to be utilized by other types of applications and not just by rule engine/configuration industry applications. The word "configurable" in the term "configurable transformation macro" means that the transformation macro may be configured to be used in a plurality of different application types.

The configurable transformation macro with its simple syntax and ability to recursively read data to complete an instruction or to indicate a completed instruction, allows the configurable transformation macro to dynamically write its own instructions. In addition, the configurable transformation macro may transform source input data into a triggered action and not necessarily just into an output data of a different file format.

Further, in addition to solving file format configuration/transformation type problems, illustrative embodiments with their functionalities may: 1) reduce the need to customize coding for extensible markup language (XML) types of transferring services or applications; 2) be incorporated into a corpus-based technology that requires the transformation of data from one data type to another; 3) be used by the corpus-based system to statistically write intelligent data that are sorted, counted, indexed, and related to a number, a character, or a word and are stored as a formatted string of data or objects that may be referenced by a transformation macro script engine to respond to executing script processes; 4) create macro bots, which are tiny pieces of automation code similar to transformation macro script except these macro bots use numbers and characters that may be created by the macro bots themselves to read, write, and gather data for triggering processors or functions within the transformation macro script engine, to automate and/or to write macro bots by other macro bots dynamically; 5) be incorporated into an artificial intelligence (AI) system, which may use the configurable transformation macro to store the macro's "memory" or "understanding" temporarily in a cache or persistently in a storage medium and/or to intelligently trigger one or more actions; 6) be incorporated into a search engine to transform data from one language into another language and also to intelligently index the transformed data by having a single language type tagged with multiple types of languages; 7) be incorporated into a simulation system to transform an inactive set of data in an area to an active set of data for that area depending on the availability of the source input data; and 8) be incorporated into a genetic analysis system to process or transform data part by part and matrix by matrix.

Moreover, in addition to generating constraints for .kbs files, illustrative embodiments may generate .kbs files that host the generated constraints. Templates, which store transformation data, may be created by developers for use by the configurable transformation macro. Illustrative embodiments do not require developers to rewrite functions in the configurable transformation macro because the configurable transformation macro uses transformation templates that define the output layout. As a result, the configurable transformation macro is able to automatically write the constraints in the desired format, without developers rewriting functions for each type of data or object transformation, by using the transformation templates as models.

Illustrative embodiments are not restricted to a specific rule engine and, thus, do not require the rule engine's application programming interface (API). However, developers may easily add an extension to call the rule engine API, if necessary, for any purpose whatsoever. In addition, illustrative embodiments may mass generate model rules in a CSV format to be used during the build process. Further, illustrative embodiments are highly portable and may be used in rule-based technologies, corpus-based technologies, and other types of applications.

As a result, illustrative embodiments break the dependency between transformation macros and rule engines. Historically, whenever a change in a rule engine was made, a corresponding modification in the transformation macro Java™ script, which involves a great deal of complexity, was required. In addition, the transformation macro was tied to the rule engine modelbuilder for constraint creation. However, illustrative embodiments allow for independent rule and configuration file generation and, therefore, do not require a rule engine.

The configurable transformation macro of illustrative embodiments reads setup information for the configurable transformation macro, reads a list of extended functions, if any, for the configurable transformation macro, and reads a list of transformation templates. A reference key, for example, is associated with each transformation template and a template filename linked to this reference key in order for the transformation macro script to identify the appropriate transformation templates to be used in the transformation process. In addition, the configurable transformation macro reads a main transformation macro script, or a list of main transformation macro scripts, which in turn reads one or more transformation templates.

These transformation macro scripts are modular in nature. Modular means that each transformation macro script is a self-contained component, which may be combined or grouped with other transformation macro scripts. Consequently, transformation macro scripts may be grouped as parent and child transformation macro scripts within one or more transformation templates or one or more other transformation macro scripts. The transformation templates may also be similarly grouped. The configurable transformation macro creates macro objects. A macro object represents a class or container, such as, for example, a data object or hash map, which stores functions, expressions, or just purely data. The configurable transformation macro logically processes these transformation macro scripts and transformation templates accordingly and outputs the final desired transformation result.

Figure 2:
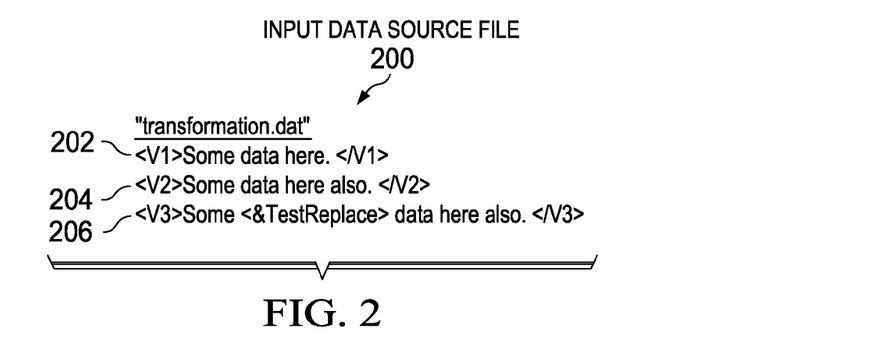
FIG. 2 is an exemplary illustration of a data source file in accordance with an illustrative embodiment.

With reference now to FIG. 2, an exemplary illustration of a data source file is depicted in accordance with an illustrative embodiment. Input data source file 200, which is named "transformation.dat" in this exemplary illustration, may, for example, represent one or more files within input data source files 120 in FIG. 1. Also, input data source file 200 may represent data from a plurality of data sources.

Figure 3:
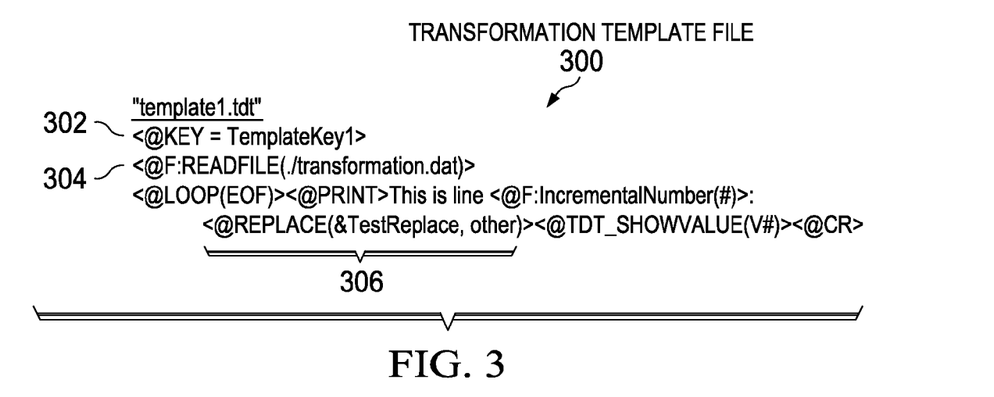
FIG. 3 is an exemplary illustration of a transformation template file in accordance with an illustrative embodiment.

In addition, input data source file 200 may be located within a transformation template, such as transformation template file 300 in FIG. 3. In this illustrative example, input data source file 200 includes input data 202 "<V1>Some data here.</V1>", input data 204 "<V2>Some data here also.</V2>", and input data 206 "<V3>Some<&TestReplace>data here also.</V3>". It should be noted that the hypertext markup language (HTML) div tags "<V1>", "<V2>", and "<V3>" are not embedded parameters recognized by a configurable transformation macro, such as configurable transformation macro 116 in FIG. 1.

With reference now to FIG. 3, an exemplary illustration of a transformation template file is depicted in accordance with an illustrative embodiment. Transformation template file 300, which is named "template1.tdt" in this exemplary illustration, may, for example, represent one or more templates within transformation templates 118 in FIG. 1. It should be noted that div tags that contain "@F", such as "@F:READFILE" and "@F: IncrementalNumber", are configurable transformation macro extended functions. Also, div tags that do not contain "@F", such as "@LOOP", "@PRINT", "@REPLACE", and "@TDT_SHOWVALUE", are configurable transformation macro internal functions.

In addition, it should be noted that div tag 302 "@ KEY" identifies the reference key associated with transformation template file 300 and the filename "TemplateKey1". Further, div tag 304 "<@F:READFILE(./transformation.dat)>" refers to the source input data, such as input data source file 200 in FIG. 2 with the same name, which the configurable transformation macro logically processes into the desired final transformation output, such as transformation output 122 in FIG. 1. Furthermore, input data source file "transformation.dat" may be located within transformation template file 300. Moreover, div tag 306 "<@REPLACE(&TestReplace,other)>" instructs the configurable transformation macro to replace the source input data "&TestReplace", such as input data 206 "<V3>Some<&TestReplace> data here also.</V3>" in FIG. 2, with "other" data.

Figure 4:
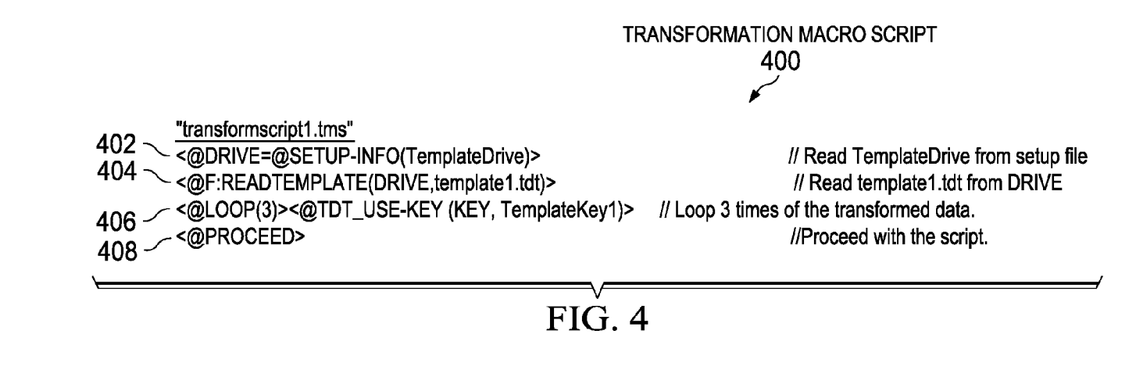
FIG. 4 is an exemplary illustration of a transformation macro script in accordance with an illustrative embodiment.

With reference now to FIG. 4, an exemplary illustration of a transformation macro script is depicted in accordance with an illustrative embodiment. Transformation macro script 400, which is named "transformscript1.tms" in this exemplary illustration, may, for example, be transformation macro script 124 in FIG. 1. In addition, transformation macro script 400 may, for example, be JavaScript®.

Div tag 402 "@DRIVE" instructs transformation macro script 400 to read a setup file to prepare the environment for the configurable transformation macro, such as configurable transformation macro 124 in FIG. 1. Div tag 404 "@F: READTEMPLATE" instructs transformation macro script 400 to read the transformation template, such as transformation template file 300 in FIG. 3 that is named "template1.tdt". Div tag 406 "@LOOP(3)" instructs transformation macro script 400 to loop through the transformation template, which has a reference key of "TemplateKey1", such as div tag 302 "<@KEY=TemplateKey1>" in FIG. 3, three times. It should be noted that the transformation template "template1.tdt" may include the source input data, such as input data source file 200 in FIG. 2 named "transformation.dat", which is to be logically processed and transformed. Div tag 408 "@PROCEED" instructs transformation macro script 400 to proceed with the logical transformation process.

Figure 5:
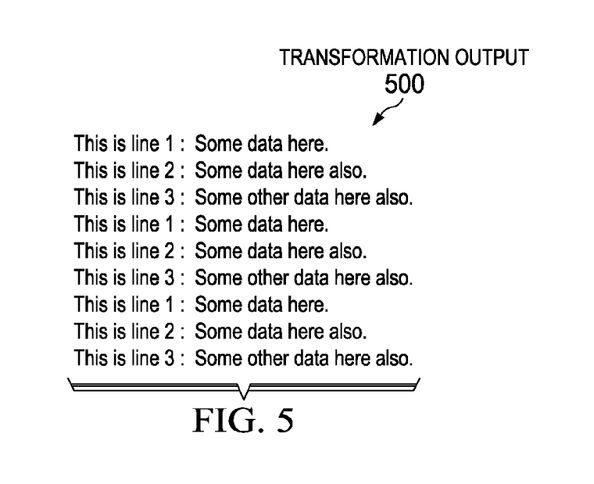
FIG. 5 is an exemplary illustration of a transformation output in accordance with an illustrative embodiment.

With reference now to FIG. 5, an exemplary illustration of a transformation output is depicted in accordance with an illustrative embodiment. Transformation output 500 may, for example, be transformation output 122 in FIG. 1. A configurable transformation macro, such as configurable transformation macro 116 in FIG. 1, produces transformation output 500 by executing a transformation macro script, such as transformation macro script 124 in FIG. 1, to logically process the source input data, such as input data source files 120 in FIG. 1, using one or more transformation templates, such as transformation templates 118 in FIG. 1.

"Some data here" in line 1 corresponds to input data 202 "<V1>Some data here.</V1>" in FIG. 2. It should be noted that lines 1, 2, and 3 are repeated three times in transformation output 500 because the div tag "@LOOP(3)" in transformation macro script 400 in FIG. 4 instructs the transformation macro script to loop through the one or more transformation templates that contain the source input data three times. "Some data here also" in line 2 corresponds to input data 204 "<V2>Some data here also.</V2>" in FIG. 2. "Some other data here also" in line 3 corresponds to input data 206 "<V3>Some<&TestReplace> data here also.</V3>". However, it should be noted that div tag 306 "<@REPLACE (&TestReplace,other)>" within transformation template file 300 in FIG. 3 instructs the configurable transformation macro to replace the source input data "&TestReplace" with the "other" data to produce the desired output "Some other data here also" in line 3 of transformation output 500.

Figure 6:
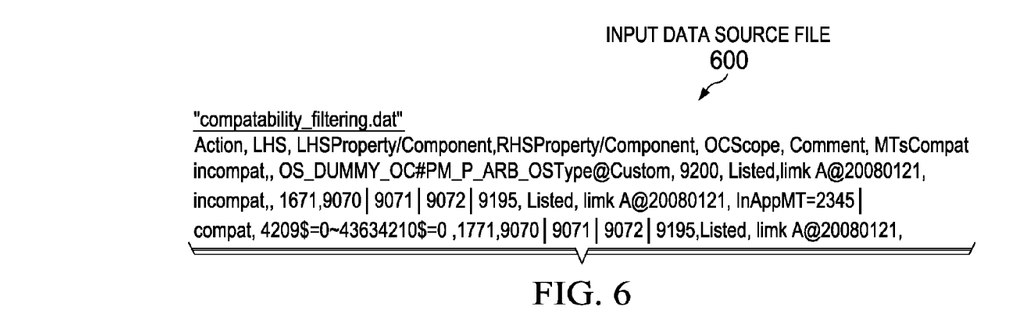
FIG. 6 is an exemplary illustration of another data source file in accordance with an illustrative embodiment.

With reference now to FIG. 6, an exemplary illustration of another data source file is depicted in accordance with an illustrative embodiment. Input data source file 600, which is named "compatibility_filtering.dat" in this exemplary illustration, may, for example, represent one or more files within input data source files 120 in FIG. 1. In this illustrative example, input data source file 600 includes a set of CSV files. Each of the files in the set of CSV files contain a different machine type. Also, it should be noted that in addition to, or instead of, transforming input data source files 600 from a CSV file format to a .kbs file format, the configurable transformation macro uses input data source file 600 to execute an action of filtering out incompatible machine types and listing compatible machine types.

Figure 7:
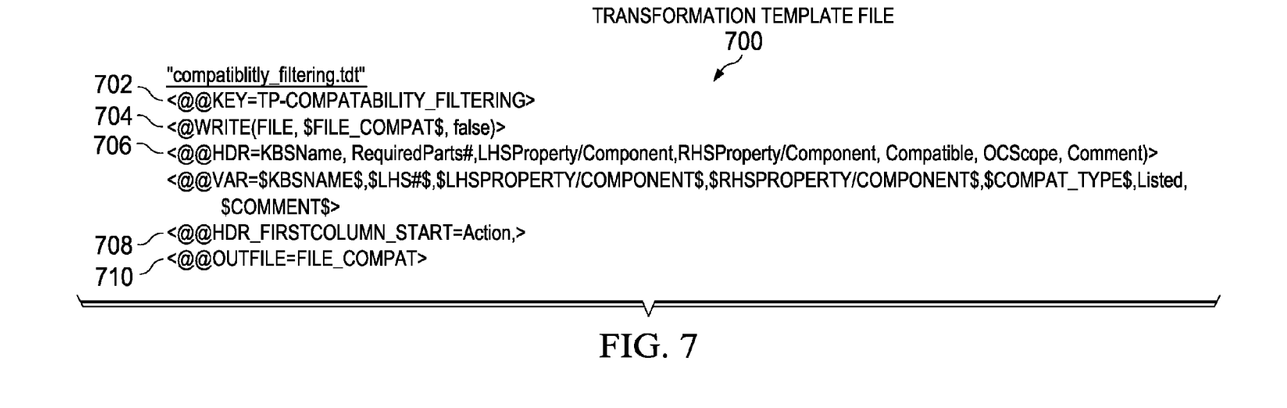
FIG. 7 is an exemplary illustration of another transformation template file in accordance with an illustrative embodiment.

With reference now to FIG. 7, an exemplary illustration of another transformation template file is depicted in accordance with an illustrative embodiment. Transformation template file 700, which is named "compatibility_filtering.tdt" in this exemplary illustration, may, for example, be transformation template 118 in FIG. 1. Div tag 702 "@ @KEY" identifies the reference key associated with transformation template file 700 with the filename "TP-COMPATIBILITY_FILTERING". Div tag 704 "@WRITE" instructs the transformation macro script to write a file that contains a list of compatible machine types. Div tag 706 "@ @HDR=KBSName" instructs the transformation macro script to transform the files from a CSV format to a .kbs format. Div tag 708 "@ @HDR_FIRSTCOLUMN_START" instructs the transformation macro script to start the machine type compatibility filtering action. Div tag 710 "@ @ OUTFILE" instructs the transformation macro script to output the desired final compatibility file.

Figure 8:
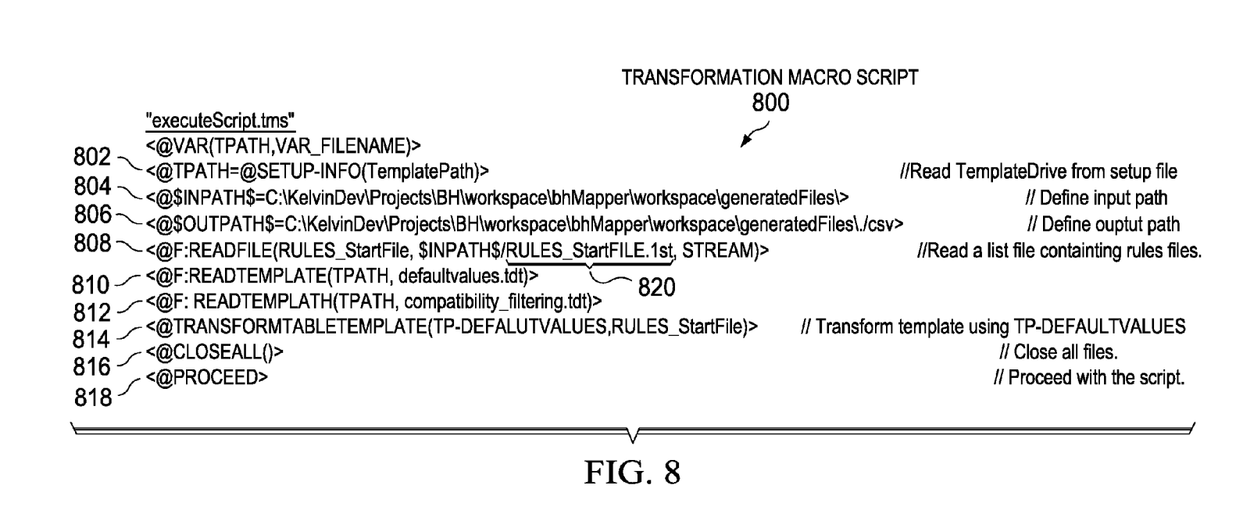
FIG. 8 is an exemplary illustration of another transformation macro script in accordance with an illustrative embodiment.

With reference now to FIG. 8, an exemplary illustration of another transformation macro script is depicted in accordance with an illustrative embodiment. Transformation macro script 800, which is named "executeScript.tms" in this exemplary illustration, may, for example, be transformation macro script 124 in FIG. 1. Div tag 802 "@TPATH" instructs transformation macro script 800 to read information in a setup file to provide the proper processing environment. Div tag 804 "@$INPATH$" defines an input path for source data. Div tag 806 "@$OUTPATH$" defines an output path for logically processed data. Div tag 808 "@F:READFILE" instructs transformation macro script 800 to read a list of rules files. "RULES_StartFile.1st" 820, which is within div tag 808 "@F:READFILE", is a file that stores a list of a plurality of different machine types.

Div tag 810 "F:READTEMPLATE(TPATH,defaultvalues.tdt)" is a transformation template file that contains all the default values and logic, which is utilized by other transformation templates, such as transformation template file 700 named "compatibility_filtering.tdt" in FIG. 7. Div tag 812 "@F:READTEMPLATE(TPATH, compatibility_filtering.tdt)" instructs transformation macro script 800 to read transformation template "compatibility_filtering.tdt". Div tag 814 "@TRANSFORMTEMPLATE" instructs transformation macro script 800 to transform the source input data using the default values from transformation template "defaultvalues.tdt". Div tag 816 "@CLOSEALL( )" instructs transformation macro script 800 to close all open files. Div tag 818 "@PROCEED" instructs transformation macro script 800 to proceed with logical processing of the source input data until completion.

Figure 9:
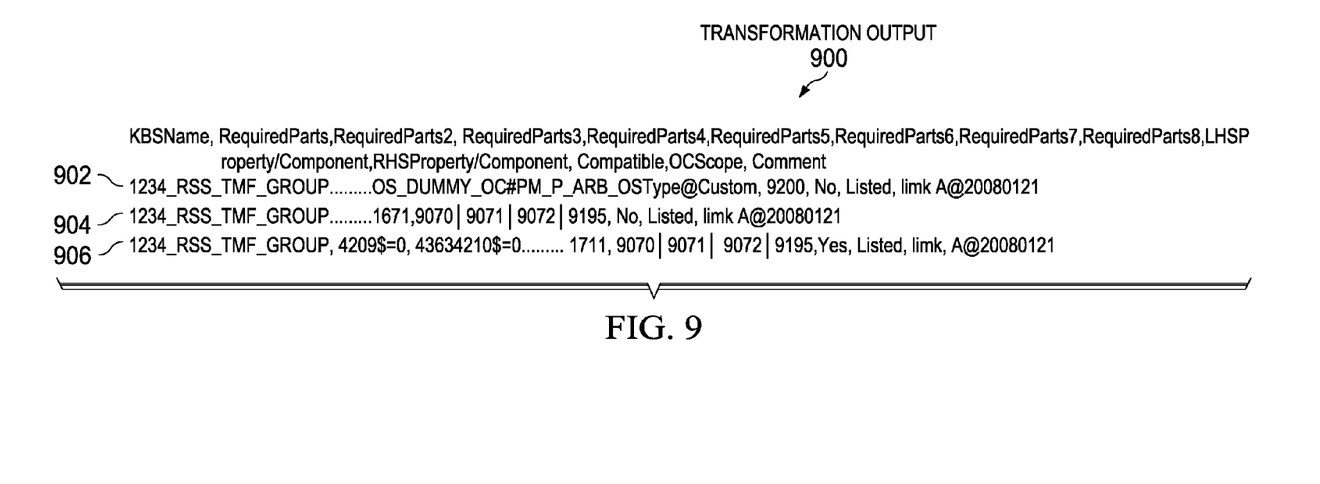
FIG. 9 is an exemplary illustration of another transformation output in accordance with an illustrative embodiment.

With reference now to FIG. 9, an exemplary illustration of another transformation output is depicted in accordance with an illustrative embodiment. Transformation output 900 may, for example, be transformation output 122 in FIG. 1. Transformation output 900 in this exemplary illustration is a list of compatible machine types converted from a CSV file format into a .kbs file format.

Also, in this exemplary illustration, machine type 902 "1234_RSS_TMF_GROUP, , , , , OS_DUMMY_OC#PM_P_ARB_OSType@Custom,9200,No,Listed,limk A@20080121" corresponds to "incompat, OS_DUMMY_OC#PM_P_ARB_OSType@Custom,9200, Listed,limk A@20080121" in input data source file 600 in FIG. 6. In addition, machine type 904 "1234 RSS_TMF_GROUP, , , , , 1671,9070|9071|9072|9195,No,Listed,limk A@20080121" corresponds to "incompat,1671, 9070|9071|9072|9195,Listed,limk A@20080121,InAppMT=2345|" in input data source file 600 in FIG. 6. Further, machine type 906 "1234_RSS_TMF_GROUP, 4209$=0,43634210$=0, , , , , 1771,9070|9071|9072|9195, Yes, Listed,limk A@20080121" corresponds to "compat, 4209$=0~43634210$=0, . . . 1771,9070|9071|9072|9195, Listed,limk A@20080121" in input data source file 600 in FIG. 6.

It should be noted that the exemplary illustrations depicted in FIGS. 2-9 are only meant as examples and not intended as limitations on illustrative embodiments. Processes of illustrative embodiments may utilize any type of input data source, transformation template, and transformation macro script necessary to produce the desired transformation output.

Figure 10:
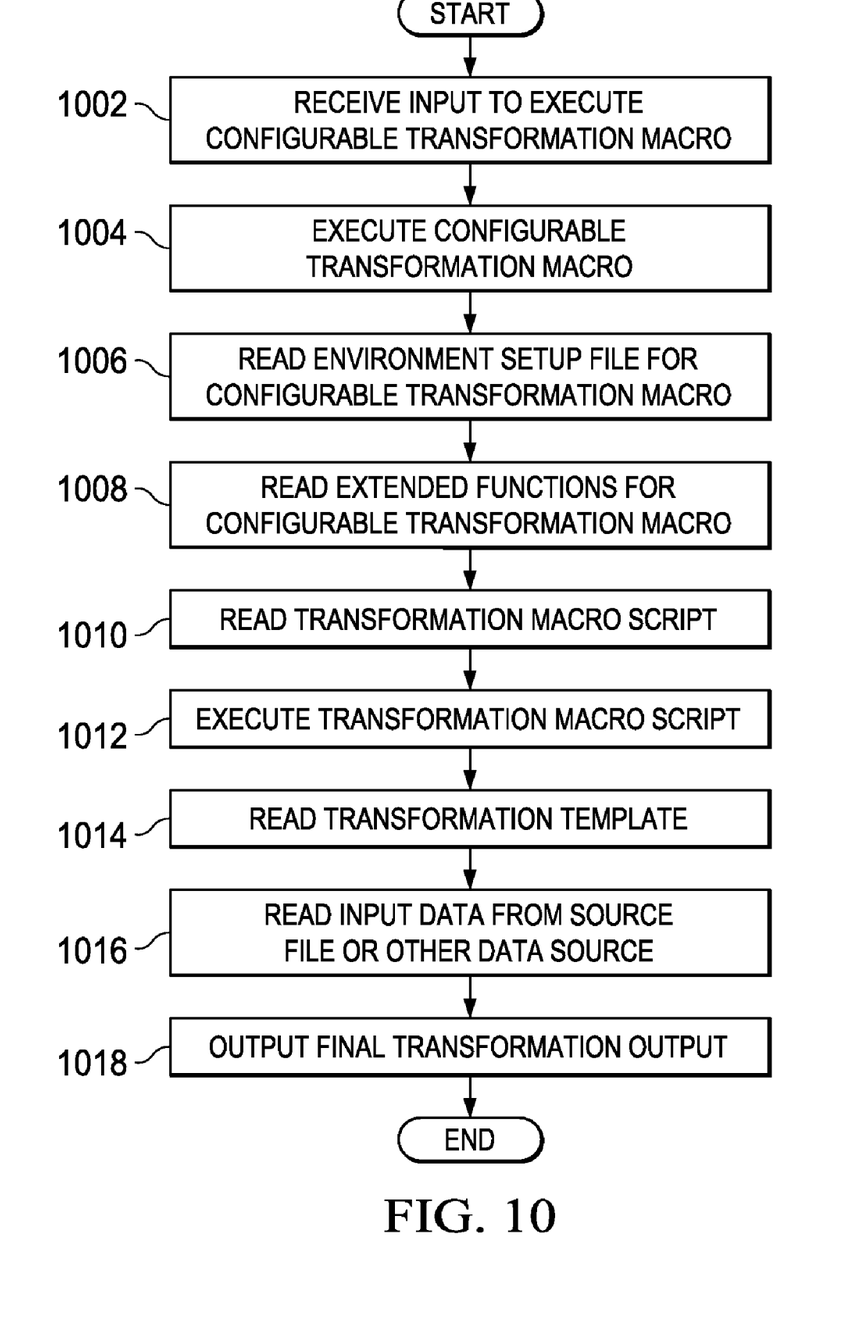
FIG. 10 is a flowchart illustrating an exemplary process for transforming source input data from one file format to another file format using a configurable transformation macro in accordance with an illustrative embodiment.

With reference now to FIG. 10, a flowchart illustrating an exemplary process for transforming source input data from one file format to another file format using a configurable transformation macro is shown in accordance with an illustrative embodiment. The process shown in FIG. 10 may be implemented in a data processing system, such as data processing system 100 in FIG. 1.

The process begins when the data processing system receives an input to execute a configurable transformation macro, such as configurable transformation macro 116 in FIG. 1 (step 1002). Then, the data processing system executes the configurable transformation macro (step 1004). Afterward, the configurable transformation macro reads an environment setup file for the configurable transformation macro (step 1006). The environment setup file is a file that contains data regarding the environment that the configurable transformation macro is being run in and the connections the configurable transformation macro has, such as, for example, external function paths, database connections, server uniform resource locators (URLs), and temporary folders and initial parameters for the configurable transformation macro.

In addition, the configurable transformation macro reads extended functions, if any, for the configurable transformation macro (step 1008). Further, the configurable transformation macro reads a transformation macro script, such as transformation macro script 400 in FIG. 4 (step 1010). It should be noted that illustrative embodiments may store the transformation macro script, in whole or in part, within a cache as opposed to a storage device, such as persistent storage 108 in FIG. 1. Then, the configurable transformation macro executes the transformation macro script (step 1012).

Afterward, the transformation macro script reads one or more transformation templates, such as transformation templates 118 in FIG. 1 (step 1014). Subsequently, the transformation macro script reads input data from one or more source files, such as input data source files 120 in FIG. 1, or from other data sources, such as a database or data stream (step 1016). Then, the transformation macro script outputs the final transformation output by, for example, writing the final transformation output to a storage device, such as persistent storage 108 in FIG. 1, printing the final transformation output to a printer, such as input/output unit 112 in FIG. 1, or displaying the final transformation output on a display device, such as display 114 in FIG. 1 (step 1018). The process terminates thereafter.

Figure 11:
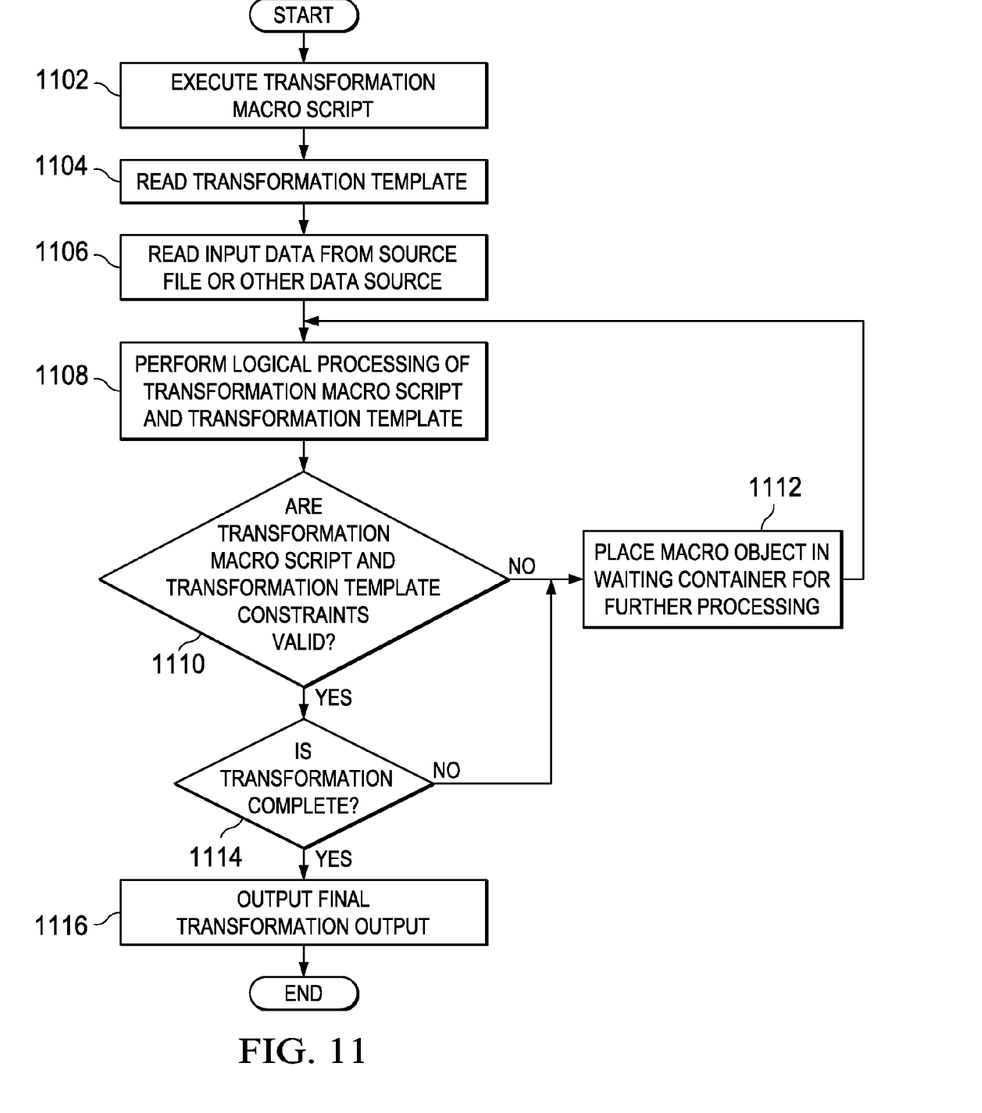
FIG. 11 is a flowchart illustrating an exemplary process for executing a transformation macro script in accordance with an illustrative embodiment.

With reference now to FIG. 11, a flowchart illustrating an exemplary process for executing a transformation macro script is shown in accordance with an illustrative embodiment. The process shown in FIG. 11 may be implemented in a configurable transformation macro, such as configurable transformation macro 116 in FIG. 1. Also, the process shown in FIG. 11 may be implemented in step 1012 in FIG. 10.

The process begins when the configurable transformation macro executes a transformation macro script, such as transformation macro script 118 in FIG. 1 (step 1102). Afterward, the transformation macro script reads one or more transformation templates, such as transformation templates 118 in FIG. 1 (step 1104). In addition, the transformation macro script reads input data from one or more source files, such as input data source files 120 in FIG. 1, or from other data sources, such as a memory variable or XML file (step 1106).

Then, the configurable transformation macro performs logical processing of the transformation macro script and the transformation template once the configurable transformation macro environment is setup (step 1108). Subsequently, the configurable transformation macro makes a determination as to whether the constraints generated by the transformation macro script and transformation template are valid (step 1110). If the transformation macro script and transformation template constraints are not valid, no output of step 1110, then the configurable transformation macro places the macro object created by the transformation macro script in a waiting container for further processing until valid completion (step 1112). Thereafter, the process returns to step 1108. Alternatively, the macro object may wait in the waiting container for a call from another logical process in order for that particular macro object to become a part of the calling logical process.

If the transformation macro script and transformation template constraints are valid, yes output of step 1110, then the configurable transformation macro makes a determination as to whether the transformation of the source input data is complete (step 1114). If the transformation of the source input data is not complete, no output of step 1114, then the process returns to step 1112. If the transformation of the source input data is complete, yes output of step 1114, then the transformation macro script outputs the final transformation output (step 1116). The process terminates thereafter.

Thus, illustrative embodiments of the present invention provide a computer implemented method, system, and computer program product for transforming source input data from one file format to another file format using a configurable transformation macro. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for transforming source input data using a transformation macro, the computer implemented method comprising computer implemented steps of:

executing, by the data processing system using the transformation macro, a transformation macro script;

reading, by the data processing system using the transformation macro script, one or more transformation templates, wherein one or more input data source files are contained within the one or more transformation templates;

reading, by the data processing system using the transformation macro script, the one or more input data source files contained within the one or more transformation templates;

performing, by the data processing system using the transformation macro, logical processing of the transformation macro script and the one or more transformation templates that contain the one or more input data source files;

determining, by the data processing system, whether constraints generated by the logical processing of the transformation macro script and the one or more transformation templates that contain the one or more input data source files are valid;

responsive to a determination by the data processing system that the constraints generated by the logical processing of the transformation macro script and the one or more transformation templates that contain the one or more input data source files are valid, transforming, by the data processing system using the transformation macro, the one or more input data source files from a first file format into a second file format; and responsive to determining by the data processing system that transformation of the one or more input data source files from the first file format into the second file format is complete, outputting, by the data processing system, a transformation output.

2. The computer implemented method of claim 1, further comprising:

responsive to a determination by the data processing system that the constraints generated by the logical processing of the transformation macro script and the one or more transformation templates that contain the one or more input data source files are not valid, placing, by the data processing system, a macro object in a waiting container for further processing.

3. The computer implemented method of claim 2, further comprising:
responsive to determining by the data processing system that the transformation of the one or more input data source files from the first file format into the second file format is not complete, placing, by the data processing system, the macro object in the waiting container for further processing until completion.

4. The computer implemented method of claim 1, further comprising:
executing, by the data processing system, the transformation macro;
reading, by the data processing system, an environment setup file for the transformation macro, wherein the environment setup file provides a processing environment that the transformation macro executes in and includes external function paths, database connections, server uniform resource locators, and temporary files and initial parameters for the transformation macro;
reading, by the data processing system, extended functions for the transformation macro; and
reading, by the data processing system, the transformation macro script.

5. The computer implemented method of claim 1, wherein the transformation macro script is a modular transformation macro script, and wherein the modular transformation macro script is combined with other modular transformation macro scripts.

6. The computer implemented method of claim 1, wherein the first file format is a comma-separated values (CSV) file format and the second file format is a knowledgebase development environment (.kbs) file format.

7. The computer implemented method of claim 1, wherein the transformation macro script is a scripting language that controls the transforming of the one or more input data source files from the first file format into the second file format.

8. The computer implemented method of claim 1, wherein one of the one or more transformation templates includes default values and logic used in the transforming of the one or more input data source files from the first file format into the second file format.

9. The computer implemented method of claim 1, wherein the transformation macro uses a simple syntax.

10. The computer implemented method of claim 1, wherein the transformation output includes a triggered data filtering action.

11. The computer implemented method of claim 1, wherein the transformation macro recursively reads data to complete an instruction or to indicate a completed instruction.

12. The computer implemented method of claim 1, wherein the one or more input data source files contained within the one or more transformation templates are provided by a plurality of data sources.

13. A data processing system for transforming source input data using a transformation macro, the data processing system comprising:
a bus system;
a storage device connected to the bus system, wherein the storage device stores a set of instructions; and
a processing unit connected to the bus system, wherein the processing unit executes the set of instructions to execute a transformation macro script using a configurable transformation macro; read one or more transformation templates using the transformation macro script, wherein one or more input data source files are contained within the one or more transformation templates; read the one or more input data source files contained within the one or more transformation templates using the transformation macro script; perform logical processing of the transformation macro script and the one or more transformation templates that contain the one or more input data source files using the configurable transformation macro; determine whether constraints generated by the logical processing of the transformation macro script and the one or more transformation templates that contain the one or more input data source files are valid; transform the one or more input data source files from a first file format into a second file format in response to a determination that the constraints generated by the logical processing of the transformation macro script and the one or more transformation templates that contain the one or more input data source files are valid; and output a transformation output in response to determining that transformation of the one or more input data source files from the first file format into the second file format is complete.

14. The data processing system of claim 13, wherein the processing unit executes a further set of instructions to execute the transformation macro; read an environment setup file for the transformation macro, wherein the environment setup file provides a processing environment that the transformation macro executes in and includes external function paths, database connections, server uniform resource locators, and temporary files and initial parameters for the transformation macro; read extended functions for the transformation macro; and read the transformation macro script.

15. A computer program product stored in a computer readable storage medium having computer usable program code embodied therein that is executable by a computer for transforming source input data using a transformation macro, the computer program product comprising:
computer usable program code for executing a transformation macro script using a configurable transformation macro;
computer usable program code for reading one or more transformation templates using the transformation macro script, wherein one or more input data source files are contained within the one or more transformation templates;
computer usable program code for reading the one or more input data source files contained within the one or more transformation templates using the transformation macro script;
computer usable program code for performing logical processing of the transformation macro script and the one or more transformation templates that contain the one or more input data source files using the configurable transformation macro;
computer usable program code for determining whether constraints generated by the logical processing of the transformation macro script and the one or more transformation templates that contain the one or more input data source files are valid;
computer usable program code for transforming the one or more input data source files from a first file format into a second file format in response to a determination that the constraints generated by the logical processing of the transformation macro script and the one or more transformation templates that contain the one or more input data source files are valid; and
computer usable program code for outputting a transformation output in response to determining that transformation of the one or more input data source files from the first file format into the second file format is complete.

16. The computer program product of claim 15, further comprising:
    computer usable program code for placing a macro object in a waiting container for further processing in response to a determination that the constraints generated by the logical processing of the transformation macro script and the one or more transformation templates that contain the one or more input data source files are not valid.

17. The computer program product of claim 16, further comprising:
    computer usable program code for placing the macro object in the waiting container for further processing until completion in responsive to determining that the transformation of the one or more input data source files from the first file format into the second file format is not complete.

18. The computer program product of claim 15, further comprising:
    computer usable program code for executing the transformation macro;
    computer usable program code for reading an environment setup file for the transformation macro, wherein the environment setup file provides a processing environment that the transformation macro executes in and includes external function paths, database connections, server uniform resource locators, and temporary files and initial parameters for the transformation macro;
    computer usable program code for reading extended functions for the transformation macro; and
    computer usable program code for reading the transformation macro script.

19. The computer program product of claim 16, wherein the transformation macro script is a modular transformation macro script, and wherein the modular transformation macro script is combined with other modular transformation macro scripts.

* * * * *